United States Patent [19]

Kaneko

[11] Patent Number: 5,173,729
[45] Date of Patent: Dec. 22, 1992

[54] DISPLAY DEVICE FOR A CAMERA

[75] Inventor: Yoshiyuki Kaneko, Kawasaki, Japan

[73] Assignee: Canon Kabushiki Kaisha, Tokyo, Japan

[21] Appl. No.: 715,744

[22] Filed: Jun. 18, 1991

Related U.S. Application Data

[63] Continuation of Ser. No. 637,958, Jan. 9, 1991, abandoned, which is a continuation of Ser. No. 314,781, Feb. 24, 1989, abandoned.

[30] Foreign Application Priority Data

Feb. 26, 1988 [JP] Japan .................. 63-43389

[51] Int. Cl.$^5$ .................................. G03B 9/64
[52] U.S. Cl. .................. 354/238.1; 354/131; 354/266; 354/267.1; 354/289.12
[58] Field of Search ............ 354/266, 131, 267.1, 354/238.1, 289.12, 465

[56] References Cited

U.S. PATENT DOCUMENTS

| | | | |
|---|---|---|---|
| 3,686,672 | 8/1972 | Ishizuka | 354/266 X |
| 3,961,342 | 6/1976 | Maida | 354/131 X |
| 4,036,762 | 7/1977 | Troetscher et al. | 354/266 X |
| 4,114,173 | 9/1978 | Tezuka et al. | 354/238.1 |
| 4,290,685 | 9/1981 | Ban | 354/266 |
| 4,864,340 | 9/1989 | Kaneko | 354/266 |
| 4,937,604 | 6/1990 | Yoshida et al. | 354/267.1 X |

FOREIGN PATENT DOCUMENTS

63-118729  5/1988  Japan .

Primary Examiner—Michael L. Gellner
Assistant Examiner—J. K. Han
Attorney, Agent, or Firm—Fitzpatrick, Cella, Harper & Scinto

[57] ABSTRACT

A display device for a camera includes a remote-control receiving circuit for receiving a remote-control signal, determination logic for determining that the remote-control receiving circuit is in a reception-standby state, and a display or alarm circuit, being responsive to the determination made by the determination logic, for indicating that the camera is in the reception-standby state.

83 Claims, 4 Drawing Sheets

DISPLAY DEVICE FOR A CAMERA

This application is a continuation of application Ser. No. 07/637,958 filed Jan. 9, 1991, which is a continuation of application Ser. No. 07/314,781 filed Feb. 24, 1989 both now abandoned.

BACKGROUND OF THE INVENTION

1. Field of the Invention

This invention relates to a display device for a camera for performing shutter release, film advance and the like by a remote-control operation, and more particularly, to a remote-control signal reception-standby display.

2. Description of the Related Art

Figure 2:
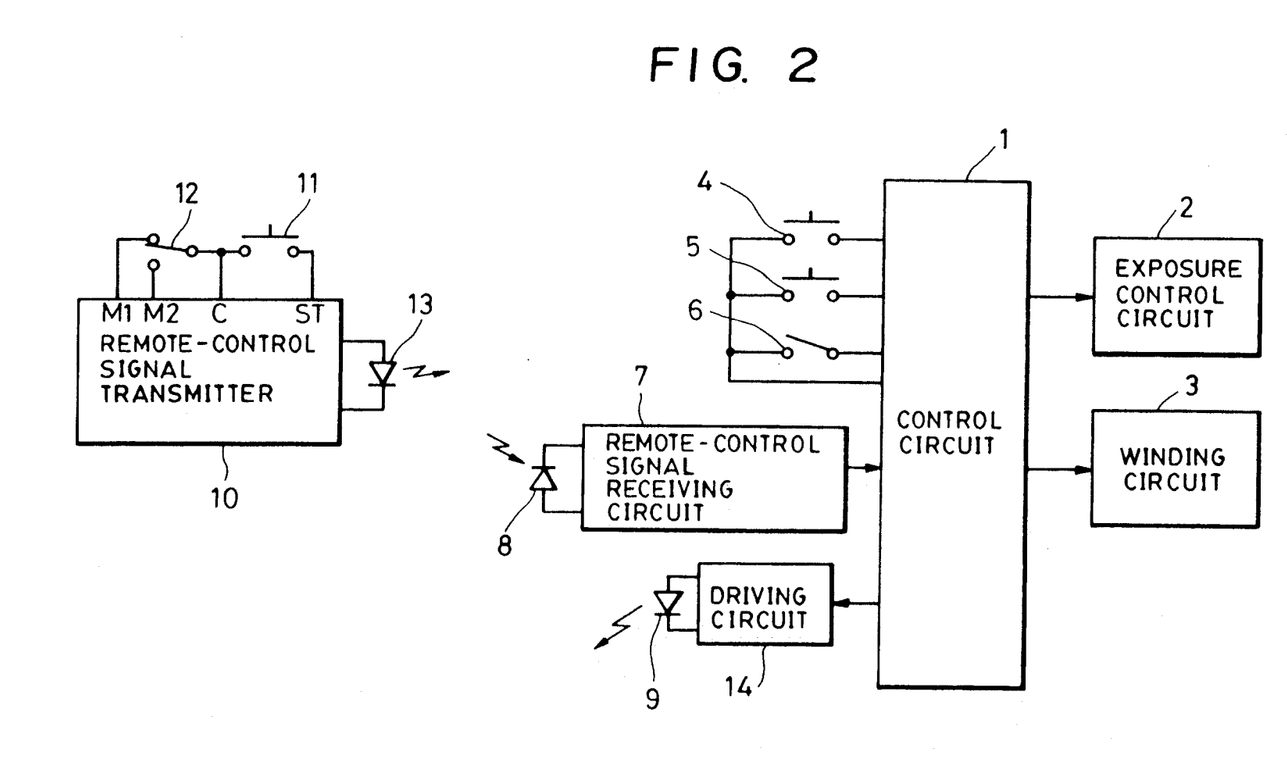
FIG. 2 is a block diagram showing an example of a circuit of the present invention and the related art.

The present applicant has proposed a device for releasing a camera mechanism by a remote-control operation in Japanese Patent Provisional Publication No. 118,729/1988 (laid open to public inspection on May 23, 1988). FIG. 2 shows a configuration in which the present invention is used in the context of the above-mentioned proposal.

FIG. 2 shows a control circuit 1 comprising a microcomputer for electrically controlling a camera. An exposure control circuit 2 for controlling a shutter and the like, and a winding circuit 3 for performing film-feeding are controlled by the control circuit 1. A release switch 4 which is turned on by depressing a release button, a self-timer switch 5 which is turned on by depressing a self-timer start button and a remote-control mode switch 6 which is turned on when a remote control signal is input to the control circuit 1, respectively.

A photosensor 8 for sensing a remote-control signal is connected to a remote-control signal receiving circuit 7 for receiving the remote control signal. When the receiving circuit 7 receives the remote-control signal, it sends an output to the control circuit 1 to indicate that the signal has been received.

An LED 9 for displaying that a self-timer is in operation is controlled by the control circuit 1 and is driven by a driving circuit 14. A remote-control signal transmitter 10 transmits the remote-control signal. A switch 11 connected thereto is depressed when the remote-control signal is to be transmitted. A switch 12 sets a signal mode to be transmitted. When the switch 12 is turned on to an M1 side, a first mode 1 signal is transmitted, and when the switch 12 is turned on to an M2 side, a second mode 2 signal is transmitted. A light-emitting device 13 emits a remote-control signal light.

Figure 6:
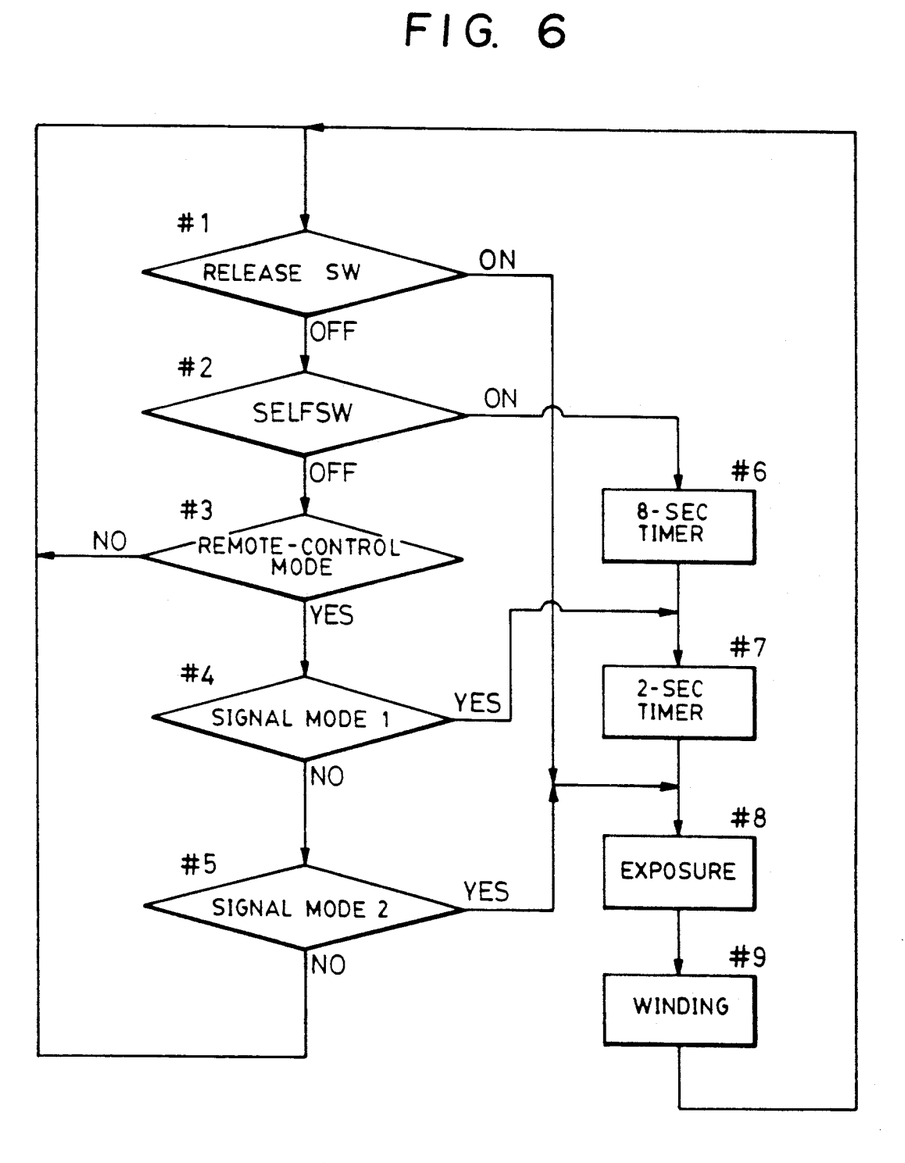
FIG. 6 is a flowchart showing an operation of a technique related to the present invention.

The operation of such a camera having a remote-control function is shown in the flow chart in FIG. 6.

First, when there is no switch operation, and stand-by is not performed so as to use remote control, a loop of steps #1→#2→#3→#1 is formed.

That is, at step #1, it is checked whether or not the release switch 4 is depressed. When it is depressed, the operation proceeds to step #8. When it is not depressed, the operation proceeds to step #2 where it is checked whether or not the self-timer switch 5 is depressed. When it is depressed, the operation proceeds to step #6. When it is not depressed, the operation proceeds to step #3, where it is checked whether or not the mode is a remote-control mode. In the case of FIG. 2, when the remote-control mode switch 6 is turned on, the mode is the remote-control mode, and the operation proceeds to step #4. When the remote-control switch 6 is off, the mode is not the remote-control mode, and the operation returns to step #1. Thus, the loop of steps #1→#2→#3→#1 recirculates until there is an input.

When the release switch 4 is depressed, the operation proceeds from step #1 to step #8. At step #8, opening/closing of a shutter is performed by the exposure control circuit 2 to expose the film. The operation then proceeds to step #9, where the film is wound by one frame by the winding circuit 3 to complete preparation for the next photographic operation, and the operation then returns to step #1.

Figure 4:
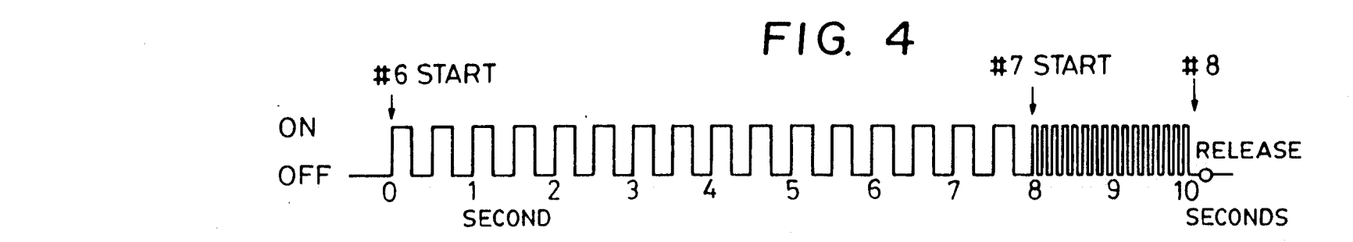
FIG. 4 is a time chart showing the timing during self-timer operation relative to a technique related to the present invention.

When the self-timer switch 5 is depressed, the operation proceeds from step #2 to step #6. Step #6 consists of a timer operation covering 8 seconds, during which time interval the LED 9 flashes at 2 Hz as a self-timer display by the driving circuit 14. After 8 seconds elapse, the operation proceeds to step #7, which consists of a timer covering 2 seconds, during which time inverval the LED 9 flashes at 8 Hz. The time chart of the operations at steps #6 and #7 is shown in FIG. 4. It is possible to confirm that the self-timer has been started (is in operation) by the flashing of the LED 9 at 2 Hz at step #6, and to know that shutter release is imminent by flashing of the LED at 8 Hz at step #7.

When 2 seconds have elapsed after beginning step #7, the operation proceeds to step #8, where exposure to the film is performed as when the release switch is depressed, and then to step #9, where winding is performed, and returns to step #1.

The foregoing description is an operational example of a case where the remote-control is not selected.

Next is an explanation of a case in which the remote-control mode switch 6 is turned on, and the mode is the remote-control mode.

In the case of the remote-control mode, it is determined at step #3 that the remote-control mode is desired. At step #4, it is checked whether or not the remote-control signal mode 1 has been received. It has not been received, the operation proceeds to #5, where it is checked whether or not the remote-control signal mode 2 has been received. If it has not been received, the operation returns to step #1.

Thus, a loop of steps #1→#2→#3→#4→#5→#1 is formed. When the release switch 4 or the self-timer switch 5 is depressed, shutter release or photographing by the self-timer is performed, respectively, totally in the same manner as in the above-described operation without using the remote-control mode.

Suppose now that the switch 11 of the remote-control signal transmitter 10 is depressed. A remote-control signal of either the mode 1 or mode 2 is then output from the light emitting device 13 depending on the state of the switch 12. This signal is sensed by the photosensor 8, and the remote-control signal receiving circuit 7 outputs to the control circuit 1 that the remote-control signal of either mode 1 or mode 2 has been received. The function for performing a determination between mode 1 and mode 2 may be provided either in the remote-control signal receiving circuit 7 or in the control circuit 1.

In the case of the mode 1 signal, for example, the operation proceeds from step #4 to step #7 in FIG. 6. The steps after step #7 are the same as those after step #7 in the case of the self-timer, wherein the self-timer display flashes for 2 seconds at 8 Hz by the LED 9, and then exposure and winding are performed at steps #8 and #9, respectively. That is, in the remote-control mode 1, when the remote-control signal has been received, shutter release is performed after 2 seconds elapse.

On the other hand, when the remote-control signal of mode 2 has been received, the operation proceeds from step #5 to step #8. Thus, when the remote-control signal of the mode 2 has been received, shutter release is immediately performed.

Now, such a display device for a camera cannot easily confirm whether or not the camera and the remote-control signal receiver are in standby state relative to remote control operation. There is an inconvenience that, in the camera illustrated in FIG. 2, for example, even when the camera is set at a standby state for receiving the remote-control signal by turning on both the switch 6 for setting the remote-control mode and the main switch for switching on the power supply of the entire camera, the user cannot easily confirm whether or not the standby state has been set.

There are also problems that, when the photographer does not notice the fact that the camera is in the standby state capable of receiving the remote-control signal, the film is wasted due to an unintended release by misoperation of the camera caused by mishandling or unintentional sending of a remote-control signal, noise or the like, or electric power is uselessly consumed in the remote-control signal receiving circuit and so consumption of the power supply battery is accelerated.

SUMMARY OF THE INVENTION

It is an object of the present invention to solve the above-mentioned problems of the prior art.

It is a further object of the present invention to provide a display device for a camera which comprises a remote-control signal receiving means for receiving a remote-control signal, determination means for determining that a remote-control signal receiving means is in a reception-standby state, and display means for positively displaying to a user, in response to the determination by the determination means, that the remote-control signal receiving means is in the reception-standby state.

It is a still further object of the present invention to configure the display means so that the reception-standby state of the remote-control signal receiving means can be recognized even by the user performing remote-control operation at a position remote from the camera.

It is still a further object of the present invention to use the above-described display means also as display means for displaying that a self-timer of the camera is in operation.

It is still another object of the present invention to arrange so that the display form of the display means for the reception-standby state of the remote-control signal receiving means is different from that for the self-timer in operation in order to prevent confusion of the two display means.

These and other objects of the present invention will become more apparent from the following preferred embodiment taken in connection with the accompanying drawings.

DESCRIPTION OF THE PREFERRED EMBODIMENT

Figure 1:
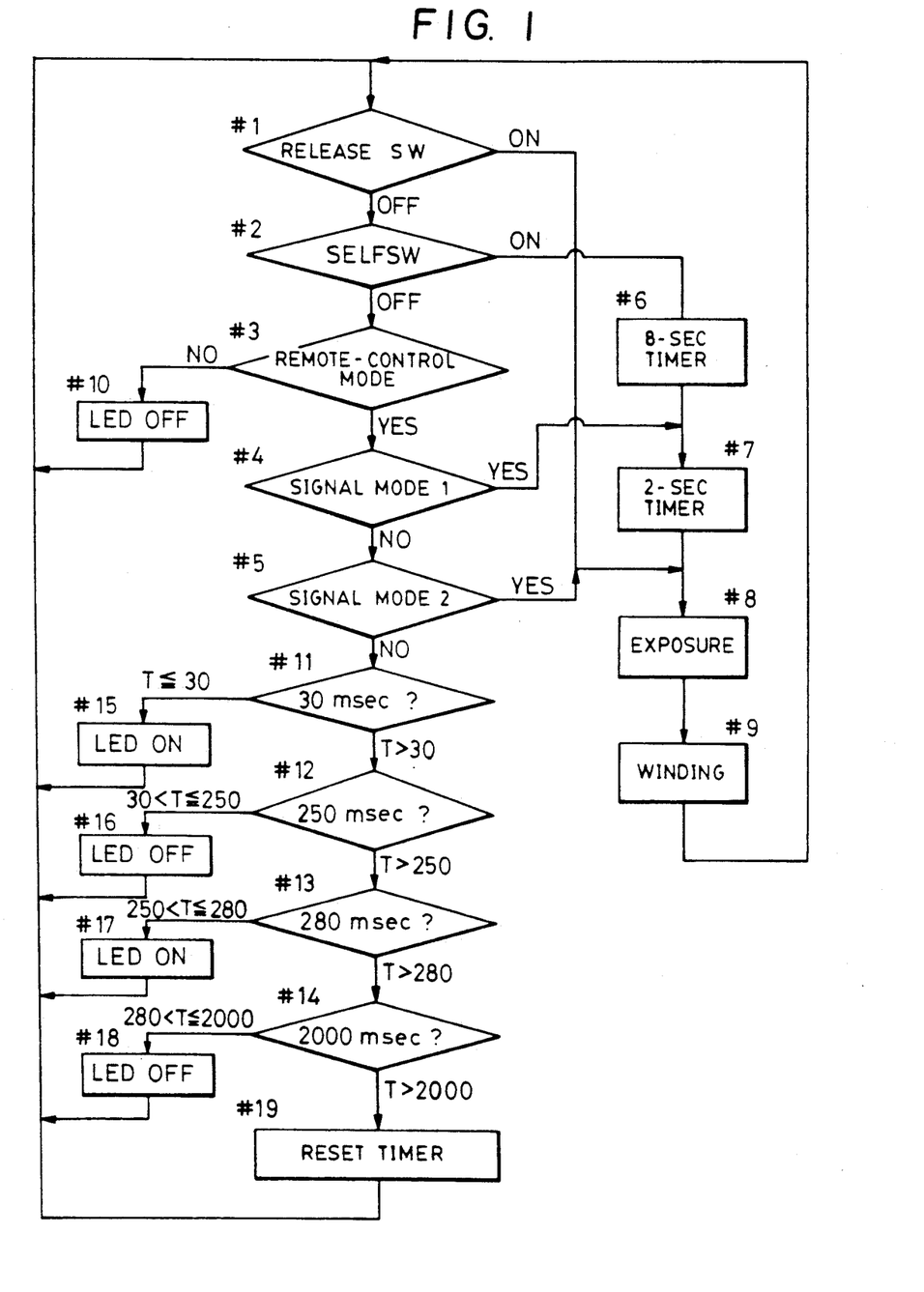
FIG. 1 is a flowchart showing an operation of an embodiment of the present invention.

FIG. 1 is a flowchart showing a preferred embodiment of the present invention. The main circuit configuration corresponding to the flowchart in FIG. 1 is that shown in FIG. 2, and also steps #1-#9 in the flowchart in FIG. 1 are similar to those shown in FIG. 6. Hence, FIGS. 2 and 6 are also used in the following explanation.

When the selected mode is not the remote-control mode, a loop of steps #1→#2→#3→#10→#1 is formed unless any switch is depressed. If the mode is not the selected remote-control mode, the operation proceeds from step #3 to step #10, where the LED 9 for displaying the self-timer in operation is turned off. That is, an off signal is latched at an output port for switching the LED 9 of a microcomputer in the control circuit 1 shown in FIG. 2. When the LED 9 has been latched at an on state before proceeding to step #10, an off state is latched at step #10, and the LED 9 remains off. When the LED has been latched at an off state before proceeding to step #10, the LED 9 remains off when the operation proceeds to step #10. When the release switch 4 and the self-timer switch 5 are depressed, the same operation as that shown in FIG. 6 is performed.

In the case of the remote-control mode, the operation proceeds from step #3 to step #4. When the remote-control signal modes 1 and 2 have not been received, the operation proceeds as #3→#4→#5→#11. At steps #11 through #14, the value of a timer incorporated in the microcomputer in the control circuit 1 is checked. Specifically, at steps #11, #12, #13 and #14, it is checked whether or not the value of the timer exceeds 30 msec, 250 msec, 280 msec and 2000 msec, respectively.

Suppose now that the value has exceeded 2000 msec. The operation then proceeds as step #1→#2→#3→#4→#5→#11 in the flowchart. At step #11, it is determined that the value exceeds 30 msec, and the operation proceeds to step #12. If the value exceeds 250 msec, the operation proceeds to step #13. If the value exceeds 280 msec, the operation proceeds to step #14. If the value exceeds 2000 msec, the operation proceeds to step #19, where the timer is reset. That is, although the value of the timer has exceeded 2000 msec before proceeding to step #19, the value of the timer becomes 0 msec when step #19 has been executed, and the operation returns to step #1.

The operation then proceeds as step #1→#2→#3→#4→#5→#11, and the value of the timer is checked at step #11. Although a certain amount of time has elapsed while proceeding from step #19 to #11, it is possible to program a microcomputer, in common use, such that the time is sufficiently short compared with 30 msec. Accordingly, the value of the timer has not reached 30 msec, and so the operation proceeds from step #11 to step #15. At step #15, the output port of the microcomputer is latched so that the self-timer display LED 9 is turned on. The operation then returns to step #1. Although the loop steps #1→#2→#3→#4→#5→#11→#15→#1 is sufficiently short compared with 30 msec, the value of the timer eventually exceeds 30 msec after circulating the loop several times. The operation then proceeds from step #11 to step #12, not to step #15, and when the value of the timer has not exceeded 250 msec, the operation then proceeds to step #16, where the LED 9 is turned off. The operation then returns to step #1, where the loop is formed again.

Figure 3:
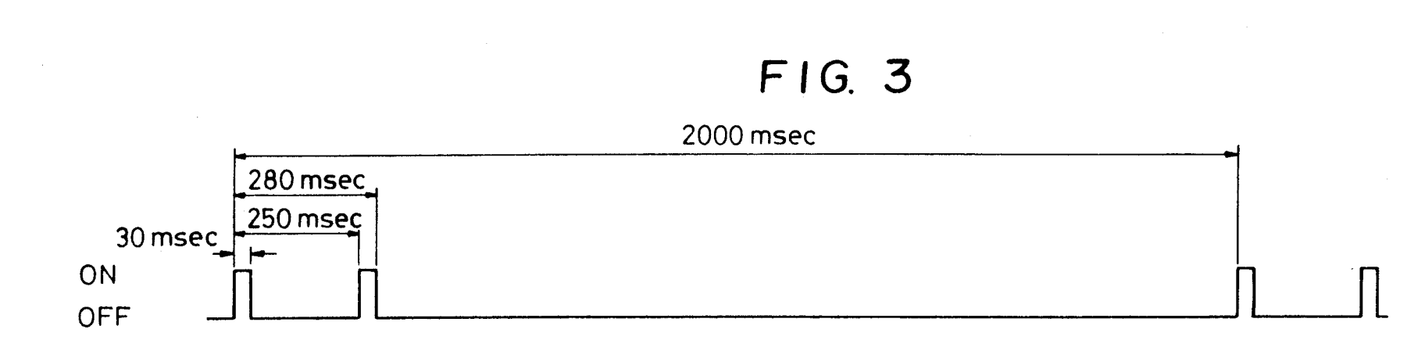
FIG. 3 is a time chart showing the timing of the operation in FIG. 1.

Thus, the self-timer display LED 9 is switched as: when T≦30 msec, the LED 9 is turned on at #15, when 30<T≦250 msec, the LED 9 is turned off at #16, when 250<T≦280 msec, the LED 9 is turned on at #17, when 280<T≦2000 msec, the LED 9 is turned off at #18, where T is the value of the timer. When T exceeds 2000 msec, the timer is reset at step #19, where T=0, and the above-described switching of the LED is repeated again. The timing chart of this operation is shown in FIG. 3.

Thus, in the remote-control mode, the LED 9 repeats flashing with a period of 2 seconds. It is also arranged so that the flashing of the LED 9 can be visually recognized even from a location remote from the camera. Hence, even a remote-control operator situated at a location remote from the camera can recognize that the camera is in a reception-standby state of the remote-control signal. Moreover, since the flashing is provided at 2 Hz or 8 Hz for the normal self-timer, there is no danger that this flashing will be confused with that of the remote-control mode.

Figure 5:
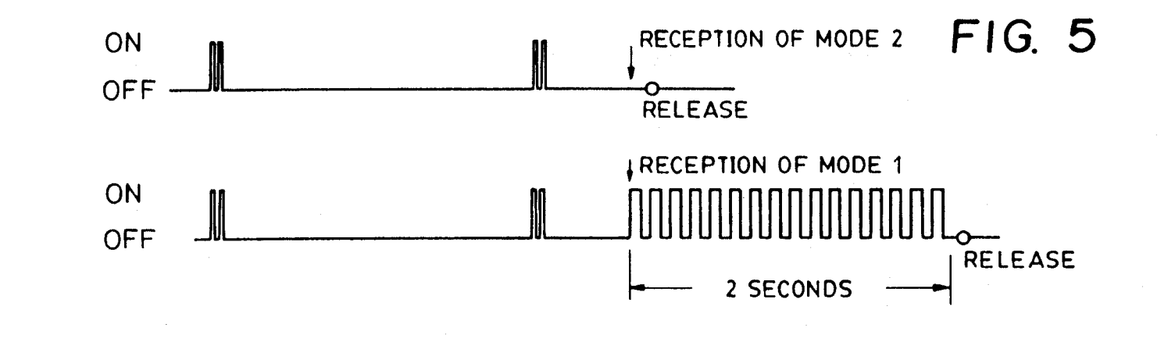
FIG. 5 is a time chart showing the timing of self-timer display when the remote-control signal in FIG. 1 is received.

The timing chart of the self-timer display LED 9 when the remote-control signal is received is shown in FIG. 5.

It is to be noted that although, in the above-described embodiment, the self-timer in operation and the remote-control standby state are displayed by the LED 9, a sound producing device such as a buzzer or the like can also be used for the same purpose. In the case of such an embodiment, the buzzer may be sounded during a period in which the LED 9 turned lighted on, and the buzzer may be silenced during a period in which the LED 9 turned lighted off. Furthermore, although, in the described embodiment, the state of the remote-control mode is determined only by the state of the remote-control mode switch in FIG. 2, other means may also be used, with the condition that the control circuit 1 can determine whether or not the mode is the remote-control mode. In a camera to which a remote-control device is attached, for example, the determination may be performed by attachment of the remote-control device to the camera.

According to the embodiment described above, the following advantages can be expected.

First, the reception-standby state of the remote-control signal can be easily confirmed. Second, it is possible to confirm that the camera is in the remote-control mode even from a location remote from the camera. Third, the battery is not uselessly consumed by inadvertently using the remote-control mode. Fourth, an alarm signal is generated in the case of inadvertently using the remote-control mode. Fifth, since the display means for the self-timer is utilized, there is no need for adding an additional LED or other signalling devices and related driving circuits and thus it is possible to prevent an increase in manufacturing costs. Sixth, since the remote-control is mostly used in place of the self-timer, the method in which the display for the remote-control is the same as that for the self-timer is natural in its conception, and understandable for the user. Seventh, since the switching period of the remote-control display is longer than that of the self-timer, the user need not hurry. Eighth, by making the switching period of the remote-control display long, a that is, by making the flashing period long, duty cycle for lighting can proportionately be reduced, and so the battery consumption is small even when the display is performed over a long period of time. In the above-described embodiment, for example, the duty cycle for the self-timer is ½, and the duty cycle for the remote-control mode is 60/2000=3/100. Hence, with the power consumption equivalent to 10 seconds of the self-timer operation, the display of the remote-control mode during the time interval of 166 seconds becomes possible.

What is claimed is:

1. A display device for use in a camera comprising:
  remote-control signal receiving means for receiving a remote-control signal for controlling an operation of the camera, wherein said remote-control signal receiving means assumes a reception-standby state when the camera is ready to receive a remote control signal;
  determination means, cooperating with said remote control signal receiving means, for determining that said remote control signal receiving means is in the reception-standby state; and
  a display circuit, responsive to the determination by said determination means, for providing an indication to a remote operator that the remote-control signal receiving means is in the reception-standby state.

2. A display device for a camera according to claim 1, wherein said display circuit also provides an indication that the camera is in a self-timer operation.

3. A display device for a camera according to claim 2, wherein the indication given by said display circuit that said remote-control signal receiving means is in a reception-standby state is different from the indication that the camera is in a self-timer operation.

4. A display device for a camera according to claim 3, wherein said display circuit includes timing means for providing an indication period when said remote control signal receiving means is in the reception-standby state that is different from an indication period when the camera is in the self-timer operation.

5. A display device for a camera according to claim 4, wherein said timing means provides an indication period in the reception-standby state of said remote-control signal receiving means that is longer than an indication period when the self-timer is in operation.

6. A display device for a camera according to claim 1, wherein the indication given by said display circuit that said remote-control signal receiving means is in a reception-standby state is different from the indication that the camera is in a self-timer operation.

7. A display device for a camera according to claim 6, wherein said display circuit includes timing means for providing an indication period when said remote-control signal receiving means is in the reception-standby state that is different from an indication period when the camera is in the self-timer operation.

8. A display device for a camera according to claim 7, wherein said timing means provides an indication period in the reception-standby state of said remote-control signal receiving means that is longer than an indication period when the self-timer is in operation.

9. A camera comprising:
   means for performing an image recording operation;
   remote-control signal receiving means for receiving a remote-control signal for controlling an image recording operation of the camera, wherein said remote-control signal receiving means assumes a reception-standby state when the camera is ready to receive a remote control signal;
   determination means, cooperating with said remote control signal receiving means, for determining that said remote control signal receiving means is in the reception-standby state; and
   a display circuit, responsive to the determination by said determination means, for providing an indication to a remote operator that the remote-control signal receiving means is in the reception-standby state.

10. A camera according to claim 9, wherein said display circuit also provides an indication that the camera is in a self-timer operation.

11. A camera according to claim 10, wherein the indication given by said display circuit that said remote-control signal receiving means is in a reception-standby state is different from the indication that the camera is in a self-timer operation.

12. A camera according to claim 11, wherein said display circuit includes timing means for providing an indication period when said remote control signal receiving means is in the reception-standby state that is different from an indication period when the camera is in the self-timer operation.

13. A camera according to claim 12, wherein said timing means provides an indication period in the reception-stand-by state of said remote-control signal receiving means that is longer than an indication period when the self-timer is in operation.

14. A camera according to claim 9, wherein the indication given by said display circuit that said remote-control signal receiving means is in a reception-standby state is different from the indication that the camera is in a self-timer operation.

15. A camera according to claim 14, wherein said display circuit includes timing means for providing an indication period when said remote-control signal receiving means is in the reception-standby state that is different from an indication period when the camera is in the self-timer operation.

16. A display device for a camera according to claim 15, wherein said timing means provides an indication period in the reception-standby state of said remote-control signal receiving means that is longer than an indication period when the self-timer is in operation.

17. An information apparatus for use in a camera, comprising:
   (a) determination means responsive to a state of the camera for determining that the camera is set for a remote control operation;
   (b) an information circuit, responsive to the determination by said determination means, for informing a remote operator of the state of the camera before the remote operator operates the camera by a remote control.

18. An information apparatus according to claim 17, wherein said determination means comprises means for determining that the camera is set to receive a remote control signal.

19. An information apparatus according to claim 17, wherein said information circuit comprises display means.

20. An information apparatus according to claim 17, wherein said information circuit comprises information means for informing the remote operator that the camera is set in a state which is independent of the state for remote control operation.

21. An information apparatus according to claim 20, wherein said information means comprises means for informing the remote operator that the camera is set for a self-timer operation.

22. An information apparatus according to claim 21, wherein said information means comprises display means.

23. An information apparatus according to claim 20, wherein said information circuit comprises variation means for causing the informing operation to vary so that the remote operator can distinguish information for a state of the camera which is independent of a state of the camera set for remote a control operation.

24. An information apparatus according to claim 23, wherein said variation means comprises timing means for varying a period during which the information is provided.

25. An information apparatus according to claim 24, wherein timing means comprises means for setting the period of the information for the remote control operation to be longer than the period of the information for the state of the camera independent of the state for remote control operation.

26. An information apparatus according to claim 23, wherein said information circuit further comprises display means.

27. An information apparatus according to claim 24, wherein said information circuit further comprises display means.

28. An information apparatus according to claim 25, wherein said information circuit further comprises display means.

29. An information apparatus according to claim 20, wherein said information circuit further comprises display means.

30. An information apparatus according to claim 21, wherein said information circuit further comprises variation means for causing the informing operation to vary so that the operator can distinguish the information for the remote control operation from the information for the self-timer operation.

31. An information apparatus according to claim 30, wherein said variation means comprises timing means for varying a period during which the information is provided.

32. An information apparatus according to claim 31, wherein said timing means comprises means for setting the period of the information for the remote control operation to be longer than the period of the information for the self-timer operation.

33. An information apparatus according to claim 30, wherein said information circuit further comprises display means.

34. An information apparatus according to claim 31, wherein said information circuit further comprises display means.

35. An information apparatus according to claim 32, wherein said information circuit further comprises display means.

36. An information apparatus according to claim 17, wherein said information circuit comprises variation means for causing the informing operation to vary so that the operator can distinguish the information for a state of the camera which is independent of the state of the camera set for a remote control operation.

37. An information apparatus according to claim 36, wherein the state of the camera independent of the state set for a remote control operation corresponds to the camera being set for a self-timer operation.

38. An information apparatus according to claim 37, wherein said information circuit further comprises display means.

39. An information apparatus according to claim 37, wherein said information circuit further comprises variation means for causing the informing operation to vary so that the operator can distinguish the information for the information for the remote control operation and the information for the self-timer operation.

40. An information apparatus according to claim 39, wherein said variation means comprises timing means for varying an information period.

41. An information apparatus according to claim 40, wherein said timing means comprises means for setting an information period for the remote control operation to be longer than an information period for the self-timer operation.

42. An information apparatus according to claim 39, wherein said information circuit further comprises display means.

43. An information apparatus according to claim 40, wherein said information circuit further comprises display means.

44. An information apparatus according to claim 41, wherein said information circuit further comprises display means.

45. An information apparatus according to claim 36, wherein said variation means comprises timing means for varying an information period.

46. An information apparatus according to claim 45, wherein timing means comprises means for setting an information period for the remote control operation to be longer than an information period for the state of the camera independent of the remote control operation.

47. An information apparatus according to claim 36, wherein said information circuit further comprises display means.

48. An information apparatus according to claim 45, wherein said information circuit further comprises display means.

49. An information apparatus according to claim 46, wherein said information circuit further comprises display means.

50. An information apparatus for a camera according to claim 17, wherein the camera is provided with said information circuit.

51. A camera comprising:
   (a) means for performing a remote control operation;
   (b) determination means responsive to a state of the camera for determining that the camera is set for a remote control operation; and
   (c) an information circuit, responsive to the determination by said determination means, for informing a remote operator of the state of the camera before the remote operator operates the camera by a remote control.

52. A camera according to claim 51, wherein said determination means comprises means for determining that the camera is set to receive a remote control signal.

53. A camera according to claim 51, wherein said information circuit comprises display means.

54. A camera according to claim 51, wherein said information circuit comprises information means for informing the remote operator that the camera is set in a state which is independent of the state for remote control operation.

55. A camera according to claim 54, wherein said information means comprises means for informing the remote operator that the camera is set for a self-timer operation.

56. A camera according to claim 55, wherein said information means comprises display means.

57. A camera according to claim 54, wherein said information circuit comprises variation means for causing the informing operation to vary so that the remote operator can distinguish information for a state of the camera which is independent of a state of the camera set for remote a control operation.

58. A camera according to claim 57, wherein said variation means comprises timing means for varying a period during which the information is provided.

59. A camera according to claim 58, wherein timing means comprises means for setting the period of the information for the remote control operation to be longer than the period of the information for the state of the camera independent of the state for remote control operation.

60. A camera according to claim 57, wherein said information circuit further comprises display means.

61. A camera according to claim 58 wherein said information circuit further comprises display means.

62. A camera according to claim 59 wherein said information circuit further comprises display means.

63. A camera according to claim 54, wherein said information circuit further comprises display means.

64. A camera according to claim 55, wherein said information circuit further comprises variation means for causing the informing operation to vary so that the operator can distinguish the information for the remote control operation from the information for the self-timer operation.

65. A camera according to claim 64, wherein said variation means comprises timing means for varying a period during which the information is provided.

66. A camera according to claim 65, wherein said timing means comprises means for setting the period of the information for the remote control operation to be longer than the period of the information for the self-timer operation.

67. A camera according to claim 64, wherein said information circuit further comprises display means.

68. A camera according to claim 65, wherein said information circuit further comprises display means.

69. A camera according to claim 66, wherein said information circuit further comprises display means.

70. A camera according to claim 51, wherein said information circuit comprises variation means for causing the informing operation to vary so that the operator can distinguish the information for a state of the camera which is independent of the state of the camera set for a remote control operation.

71. A camera according to claim 70, wherein the state of the camera independent of the state set for a remote control operation corresponds to the camera being set for a self-timer operation.

72. A camera according to claim 71, wherein said information circuit further comprises display means.

73. A camera according to claim 71, wherein said information circuit further comprises variation means for causing the informing operation to vary so that the operator can distinguish the information for the information for the remote control operation and the information for the self-timer operation.

74. A camera according to claim 73, wherein said variation means comprises timing means for varying an information period.

75. A camera according to claim 74, wherein said timing means comprises means for setting an information period for the remote control operation to be longer than an information period for the self-timer operation.

76. A camera according to claim 73, wherein said information circuit further comprises display means.

77. A camera according to claim 74, wherein said information circuit further comprises display means.

78. A camera according to claim 75, wherein said information circuit further comprises display means.

79. A camera according to claim 70, wherein said variation means comprises timing means for varying an information period.

80. A camera according to claim 79, wherein timing means comprises means for setting an information period for the remote control operation to be longer than an information period for the state of the camera independent of the remote control operation.

81. A camera according to claim 70, wherein said information circuit further comprises display means.

82. A camera according to claim 79, wherein said information circuit further comprises display means.

83. A camera according to claim 80, wherein said information circuit further comprises display means.

* * * * *

UNITED STATES PATENT AND TRADEMARK OFFICE
CERTIFICATE OF CORRECTION

PATENT NO. : 5,173,729

DATED : December 22, 1992

INVENTOR(S) : Yoshiyuki KANEKO

It is certified that error appears in the above-identified patent and that said Letters Patent is hereby corrected as shown below:

COLUMN 1:

line 35, "remote control" should read --remote-control--; and
    line 58, "step %8." should read --#8.--.

COLUMN 2:

line 17, "inverval" should read --interval--;
    line 30, "remote-control" should read --remote-control operation--; and
    line 37, "It" should read --If it--.

COLUMN 3:

line 6, "the" should be deleted.

COLUMN 4:

line 23, "mode" should read --selected mode--;
    line 24, "selected" should be deleted; and
    line 61, "step" should read --steps--.

COLUMN 5:

line 4, "loop" should read --loop of--;
    line 19, "#18," should read --step #18,--;
    line 44, "lighted" should be deleted--; and
    line 46, "lighted" should be deleted--.

UNITED STATES PATENT AND TRADEMARK OFFICE
CERTIFICATE OF CORRECTION

PATENT NO. : 5,173,729

DATED : December 22, 1992

INVENTOR(S) : Yoshiyuki KANEKO

It is certified that error appears in the above-identified patent and that said Letters Patent is hereby corrected as shown below:

<u>COLUMN 6</u>:

line 9, "a" should be deleted; and
line 10, "long," should read --long, a--.

Signed and Sealed this

Eighteenth Day of January, 1994

Attest:

BRUCE LEHMAN

*Attesting Officer*     *Commissioner of Patents and Trademarks*